United States Patent
Ha et al.

(10) Patent No.: US 11,972,387 B2
(45) Date of Patent: Apr. 30, 2024

(54) METHOD, SYSTEM, AND NON-TRANSITORY COMPUTER-READABLE RECORDING MEDIUM FOR CONTROLLING A TRANSPORT ROBOT

(71) Applicant: Bear Robotics, Inc., Redwood City, CA (US)

(72) Inventors: John Jungwoo Ha, Frisco, TX (US); Jungju Oh, Seoul (KR)

(73) Assignee: Bear Robotics, Inc., Redwood City, CA (US)

( * ) Notice: Subject to any disclaimer, the term of this patent is extended or adjusted under 35 U.S.C. 154(b) by 0 days.

(21) Appl. No.: 17/367,809

(22) Filed: Jul. 6, 2021

(65) Prior Publication Data

US 2023/0011132 A1 Jan. 12, 2023

(51) Int. Cl.
*G06Q 10/08* (2024.01)
*B25J 9/00* (2006.01)
*B25J 9/16* (2006.01)
*G06Q 10/0832* (2023.01)
*G06Q 10/0836* (2023.01)
*G06Q 50/40* (2024.01)

(52) U.S. Cl.
CPC ........ *G06Q 10/0832* (2013.01); *B25J 9/0003* (2013.01); *B25J 9/1679* (2013.01); *G06Q 10/0836* (2013.01); *G06Q 50/40* (2024.01)

(58) Field of Classification Search
CPC ........... G06Q 10/0832; G06Q 10/0836; G06Q 50/30; B25J 9/0003; B25J 9/1679
See application file for complete search history.

(56) References Cited

U.S. PATENT DOCUMENTS

| | | | |
|---|---|---|---|
| 10,245,993 B1* | 4/2019 | Brady | B60H 1/00771 |
| 2017/0323257 A1* | 11/2017 | Cheatham, III | G06Q 10/0631 |
| 2018/0281657 A1* | 10/2018 | Healey | G06Q 10/08 |
| 2019/0049995 A1* | 2/2019 | Ferguson | B60H 1/00735 |
| 2020/0272151 A1 | 8/2020 | Endo et al. | |

FOREIGN PATENT DOCUMENTS

| | | |
|---|---|---|
| KR | 20180031114 A | 3/2018 |
| KR | 1020180080499 A | 7/2018 |
| KR | 1020180085324 A | 7/2018 |
| KR | 1020190103105 A | 9/2019 |
| KR | 102245333 B1 | 4/2021 |

OTHER PUBLICATIONS

Albrecht, Chris, Woowa Delivery Robots to Access Buildings and Ride Elevators Next Year, Nov. 4, 2020, The Spoon, https://thespoon.tech/woowa-delivery-robots-to-access-buildings-and-ride-elevators-next-year/ (Year: 2020).*

* cited by examiner

*Primary Examiner* — Resha Desai
*Assistant Examiner* — Michelle E Carey
(74) *Attorney, Agent, or Firm* — Dinsmore & Shohl LLP; Yongsok Choi, Esq.

(57) ABSTRACT

A method for controlling a transport robot is provided. The method includes the steps of: acquiring, when a user makes a request for transport of a target object, information on the user and information on the transport of the target object including a delivery place of the target object; identifying the user on the basis of the information on the user, and determining a place associated with the user as a destination where a transport robot is to transport the target object from the delivery place, with reference to a result of the identification; and causing the target object to be transported to the destination by the transport robot.

13 Claims, 3 Drawing Sheets

METHOD, SYSTEM, AND NON-TRANSITORY COMPUTER-READABLE RECORDING MEDIUM FOR CONTROLLING A TRANSPORT ROBOT

FIELD OF THE INVENTION

The present invention relates to a method, system, and non-transitory computer-readable recording medium for controlling a transport robot.

BACKGROUND

As researches on autonomous navigation robots are actively carried out in recent years, techniques for transporting things using such robots in a place such as a smart factory or a distribution center have been introduced.

As an example of related conventional techniques, Korean Laid-Open Patent Publication No. 10-2018-0085324 discloses a line tracer transport robot using RFID (Radio-Frequency Identification), the transport robot comprising: an input unit for receiving movement position information of an RFID card and cargo unloading information; a control unit for receiving information from the input unit and applying control signals to a movement motor, a conveyance motor, and a support motor; a movement unit for discriminating a black line marked on a floor surface through an infrared diode and moving over the black line using the position information received from the control unit; and a conveyance unit for unloading the cargo when a cargo unloading signal is applied from the control unit.

However, the techniques introduced so far as well as the above-described conventional technique have failed to suggest transporting an object to a place associated with a user (e.g., a residence of the user) by a robot when the user simply places the object at a predetermined place even though the user does not input the place where the object is to be transported.

In this connection, the inventor(s) present a technique for controlling a transport robot such that the transport robot transports a target object to a place associated with a user when the user places the target object at a predetermined place and makes a request for transport of the target object.

SUMMARY OF THE INVENTION

One object of the present invention is to solve all the above-described problems in the prior art.

Another object of the invention is to acquire, when a user makes a request for transport of a target object, information on the user and information on the transport of the target object including a delivery place of the target object; identify the user on the basis of the information on the user, and determine a place associated with the user as a destination where a transport robot is to transport the target object from the delivery place, with reference to a result of the identification; and cause the target object to be transported to the destination by the transport robot.

Yet another object of the invention is to control a transport robot such that the transport robot transports a target object to a place associated with a user (e.g., a residence of the user) when the user simply places the target object at a predetermined place even though the user does not input the place where the target object is to be transported.

The representative configurations of the invention to achieve the above objects are described below.

According to one aspect of the invention, there is provided a method for controlling a transport robot, the method comprising the steps of: acquiring, when a user makes a request for transport of a target object, information on the user and information on the transport of the target object including a delivery place of the target object; identifying the user on the basis of the information on the user, and determining a place associated with the user as a destination where a transport robot is to transport the target object from the delivery place, with reference to a result of the identification; and causing the target object to be transported to the destination by the transport robot.

According to another aspect of the invention, there is provided a system for controlling a transport robot, the system comprising: an information acquisition unit configured to acquire, when a user makes a request for transport of a target object, information on the user and information on the transport of the target object including a delivery place of the target object; a determination unit configured to identify the user on the basis of the information on the user, and determine a place associated with the user as a destination where a transport robot is to transport the target object from the delivery place, with reference to a result of the identification; and a transport management unit configured to cause the target object to be transported to the destination by the transport robot.

In addition, there are further provided other methods and systems to implement the invention, as well as non-transitory computer-readable recording media having stored thereon computer programs for executing the methods.

According to the invention, it is possible to acquire, when a user makes a request for transport of a target object, information on the user and information on the transport of the target object including a delivery place of the target object; identify the user on the basis of the information on the user, and determine a place associated with the user as a destination where a transport robot is to transport the target object from the delivery place, with reference to a result of the identification; and cause the target object to be transported to the destination by the transport robot.

According to the invention, it is possible to control a transport robot such that the transport robot transports a target object to a place associated with a user (e.g., a residence of the user) when the user simply places the target object at a predetermined place even though the user does not input the place where the target object is to be transported.

DETAILED DESCRIPTION OF THE INVENTION

Figure 1:
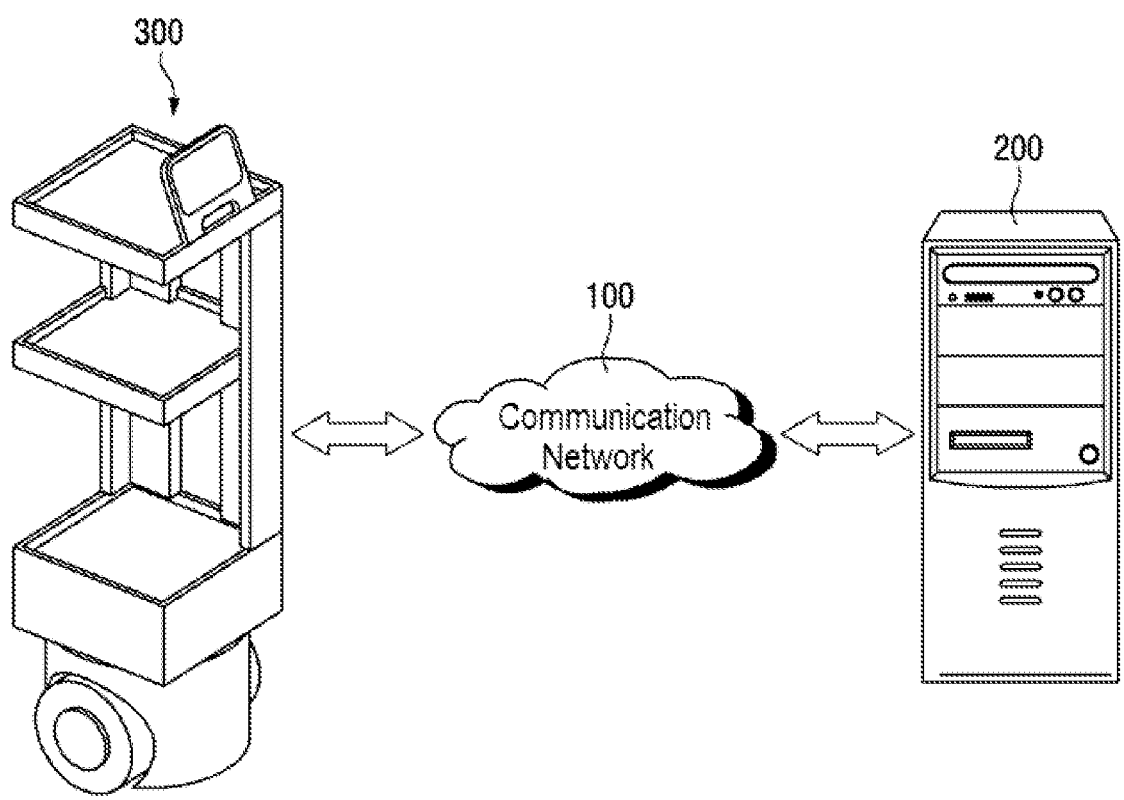
FIG. 1 schematically shows the configuration of an entire system for controlling a transport robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Meanwhile, although the cases in which the place where a transport robot is used is an apartment complex are mainly described herein, it should be understood that the present invention is not necessarily applicable only to the transport robot used in the apartment complex, and may also be applied to a transport robot used in a different place such as a distribution center when it is required to transport a target object according to a user's request.

Configuration of the Entire System

FIG. 1 schematically shows the configuration of the entire system for controlling a transport robot according to one embodiment of the invention.

As shown in FIG. 1, the entire system according to one embodiment of the invention may comprise a communication network 100, a robot control system 200, and a transport robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the robot control system 200 according to one embodiment of the invention may function to: acquire, when a user makes a request for transport of a target object, information on the user and information on the transport of the target object including a delivery place of the target object; identify the user on the basis of the information on the user, and determine a place associated with the user as a destination where a transport robot is to transport the target object from the delivery place, with reference to a result of the identification; and cause the target object to be transported to the destination by the transport robot.

The configuration and functions of the robot control system 200 according to the invention will be discussed in more detail below.

Next, the transport robot 300 according to one embodiment of the invention is a device capable of communicating with the robot control system 200 via the communication network 100 and performing predetermined functions or assigned tasks (e.g., transporting objects) autonomously without any operation of a user (e.g., a resident of an apartment complex). The transport robot 300 according to one embodiment of the invention may include at least one of a module (e.g., a grab or a robotic arm module) for loading and unloading an object to be transported (e.g., baggage of the user) (hereinbefore and hereinafter referred to as a "target object"), an image acquisition module (e.g., a visible light camera or an infrared camera) for acquiring images of surroundings, a sound acquisition module (e.g., a microphone) for acquiring sounds of surroundings, a display and speaker module for providing images and sounds, and a drive module (e.g., a motor) for moving the transport robot 300.

Meanwhile, according to one embodiment of the invention, the transport robot 300 may include an application (not shown) for controlling the transport robot 300 according to the invention. The application may be downloaded from the robot control system 200 or an external application distribution server (not shown). Meanwhile, the characteristics of the application may be generally similar to those of an information acquisition unit 210, a determination unit 220, a transport management unit 230, a communication unit 240, and a control unit 250 of the robot control system 200 to be described below. Here, at least a part of the application may be replaced with a hardware device or a firmware device that may perform a substantially equal or equivalent function, as necessary.

Configuration of the Transport Robot

For example, the transport robot 300 according to one embodiment of the invention may perform tasks similar to those performed by at least one of a guide robot, a serving robot, a cleaning robot, a medical robot, an entertainment robot, a pet robot, and an unmanned flying robot, and may be implemented in various forms corresponding to the respective tasks.

Figure 3:
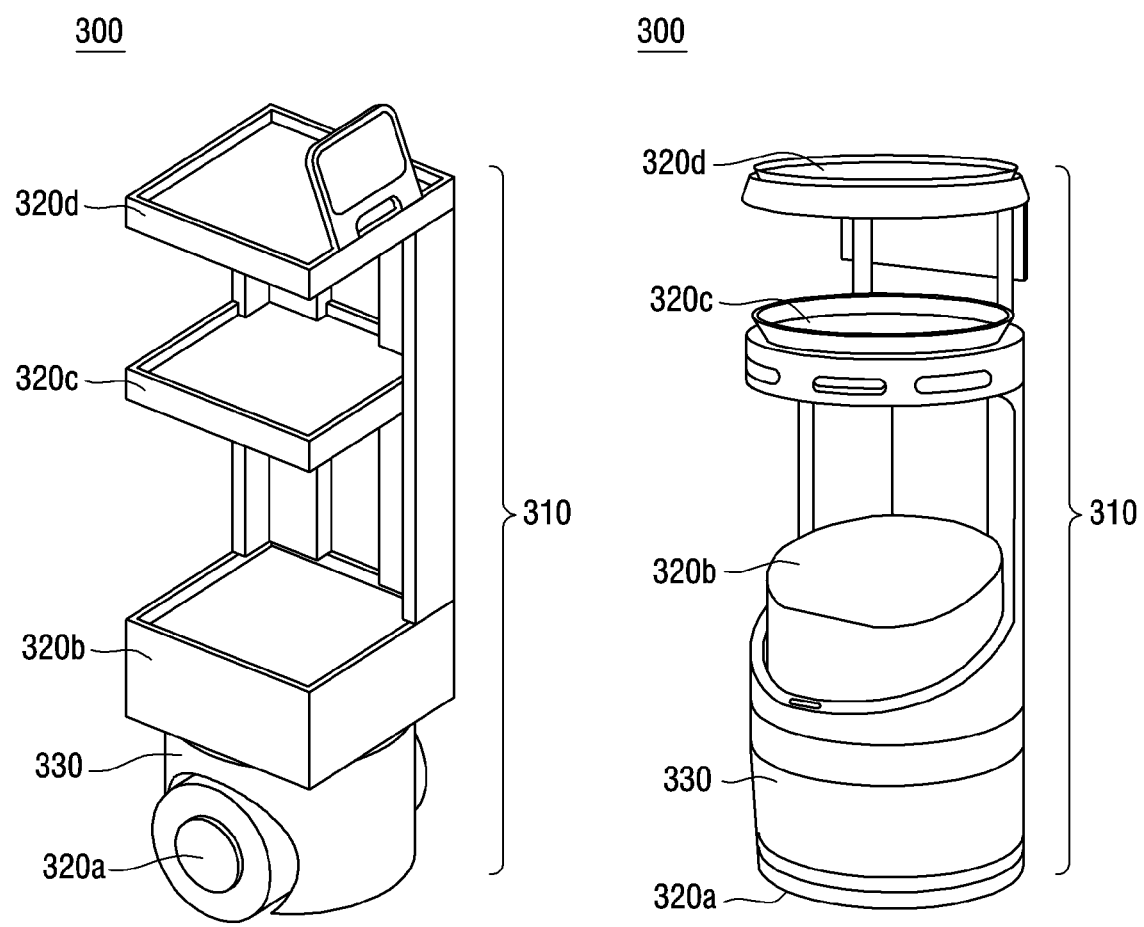
FIG. 3 illustratively shows the structure of a transport robot according to one embodiment of the invention.

FIG. 3 illustratively shows the structure of a transport robot according to one embodiment of the invention.

Referring to FIG. 3, the transport robot 300 may comprise a main body 310, a drive unit 320a, 320b, 320c, 320d, and a processor 330.

For example, the main body 310 according to one embodiment of the invention may include at least one loading space for loading a target object. The target object according to one embodiment of the invention may refer to all material objects that can be moved, and may encompass things, animals, and people, for example. For example, the target object may be baggage carried by a user or his/her vehicle to a delivery place.

For example, the transport robot 300 according to one embodiment of the invention may include a first space 320b and a second space 320c for transporting the target object. Further, the transport robot 300 may further include a third space 320d that is an expansion space provided via a removable pillar, and more loading spaces may be provided by adding more expansion spaces as needed. However, the loading spaces of the transport robot 300 according to the invention are not necessarily limited to the above description, and may be diversely implemented as other types of loading spaces as long as the objects of the invention may be achieved.

Referring further to FIG. 3, the main body 310 may further include an image acquisition module (e.g., a visible light camera or an infrared camera) (not shown) and a scanner module (e.g., a LIDAR sensor) for acquiring images of surroundings (e.g., images of users, other people or things around the transport robot 300, other transport robots 300, etc.) and information on obstacles.

Next, the drive unit 320a, 320b, 320c, 320d according to one embodiment of the invention may comprise a module for moving the main body 310 to other locations or a module for loading and unloading the target object.

For example, the drive unit 320a, 320b, 320c, 320d may include a module related to electrically, mechanically, or hydraulically driven wheels, propellers, or the like as the module for moving the main body 310 to other locations, and may include a robotic arm module for mounting and conveying the target object as the module for loading and unloading the target object.

Next, the processor 330 according to one embodiment of the invention may be electrically connected to the drive unit 320a, 320b, 320c, 320d to perform a function of controlling the drive unit 320a, 320b, 320c, 320d (and may include a communication module for communicating with an external system). For example, the processor 330 may refer to a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 330 may perform the functions of at least one of the information acquisition unit 210, the determination unit 220, and the transport management unit 230 of the robot control system 200 according to the invention (e.g., the corresponding functions may be modularized and included in the processor 330), and may function to control the drive unit 320a, 320b, 320c, 320d through communication with an external system (not shown) that performs the functions of at least one of the information acquisition unit 210, the determination unit 220, and the transport management unit 230.

Specifically, the processor 330 may function to: acquire, when a user makes a request for transport of a target object, information on the user and information on the transport of the target object including a delivery place of the target object; identify the user on the basis of the information on the user, and determine a place associated with the user as a destination where a transport robot is to transport the target object from the delivery place, with reference to a result of the identification; and cause the target object to be transported to the destination by the transport robot.

Configuration of the Robot Control System

Hereinafter, the internal configuration of the robot control system 200 crucial for implementing the invention and the functions of the respective components thereof will be discussed.

Figure 2:
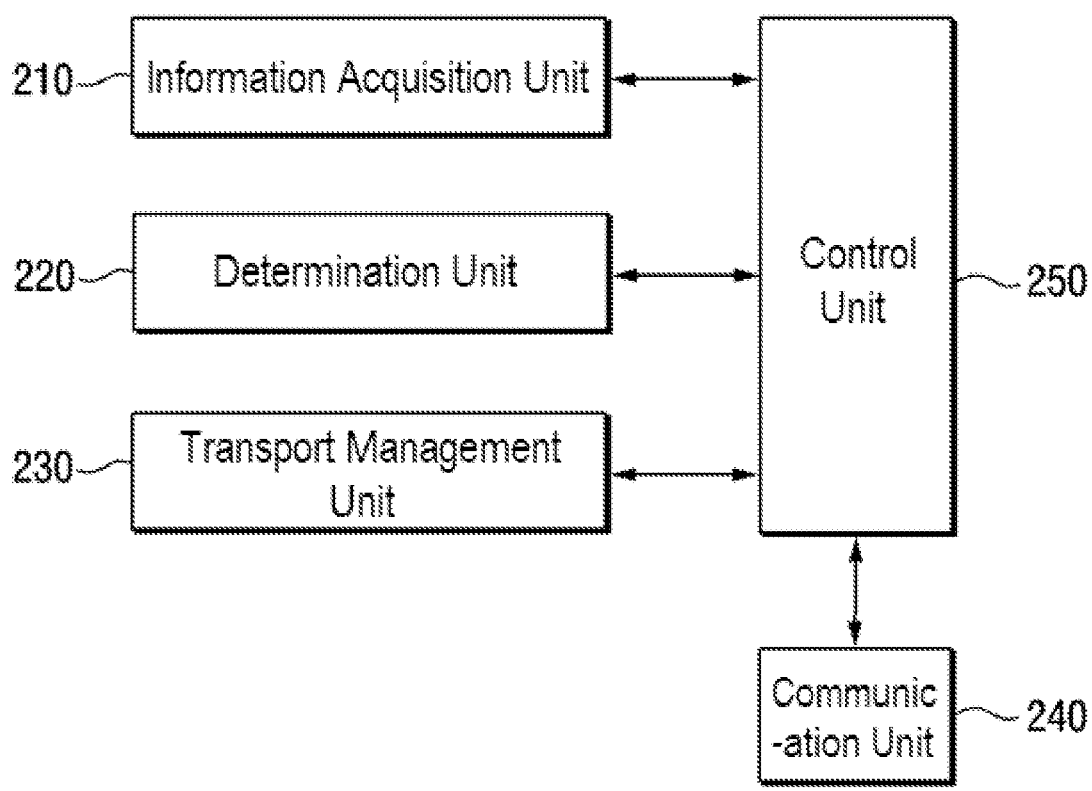
FIG. 2 specifically shows the internal configuration of a robot control system according to one embodiment of the invention.

FIG. 2 specifically shows the internal configuration of the robot control system 200 according to one embodiment of the invention.

As shown in FIG. 2, the robot control system 200 according to one embodiment of the invention may comprise an information acquisition unit 210, a determination unit 220, a transport management unit 230, a communication unit 240, and a control unit 250. According to one embodiment of the invention, at least some of the information acquisition unit 210, the determination unit 220, the transport management unit 230, the communication unit 240, and the control unit 250 may be program modules that communicate with an external system. The program modules may be included in the robot control system 200 in the form of operating systems, application program modules, and other program modules, while they may be physically stored in a variety of commonly known storage devices.

Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the transport robot 300 or an external system (not shown), as necessary. Further, in some cases, all of the functions and components of the robot control system 200 may be implemented or included in the transport robot 300.

First, the information acquisition unit 210 according to one embodiment of the invention may function to acquire, when a user makes a request for transport of a target object, information on the user and information on the transport of the target object including a delivery place of the target object.

Specifically, according to one embodiment of the invention, the user's request for the transport of the target object (e.g., baggage of the user) may be made by the user requesting to move the transport object to a predetermined place (e.g., a residence of the user). According to one embodiment of the invention, the user's request may be made by the user arriving at the delivery place of the target object or placing the target object at the delivery place of the target object, and may also be made by the user requesting the transport of the target object using a navigation system or another application (which may interwork with the navigation system) of his/her vehicle in a place (e.g., a parking lot of a mart) distinct from the delivery place.

Next, when the user's request for the target object is made as above, the information acquisition unit 210 according to one embodiment of the invention may acquire the information on the user and the information on the transport of the target object. Here, according to one embodiment of the invention, the information on the transport of the target object may include information on the delivery place of the target object, and the delivery place may refer to a place where the target object may be placed within a predetermined spatial extent (e.g., an apartment complex where the user resides).

For example, when the user's request is made by the user arriving at the delivery place of the target object or placing the target object at the delivery place of the target object, the information acquisition unit 210 according to one embodiment of the invention may acquire a location of the delivery place as the information on the transport of the target object. Further, the information acquisition unit 210 according to one embodiment of the invention may acquire information necessary for identification of the user (e.g., RFID information, a face image, or a voice of the user) as the information on the user, using at least one of a signal recognition module (e.g., an RFID reader), an image acquisition module (e.g., a visible light camera or an infrared camera), a scanner module (e.g., a LIDAR sensor), and a sound acquisition module (e.g., a microphone) that may be included or installed in the transport robot 300 and/or the delivery place. Meanwhile, according to one embodiment of the invention, the user may personally load the target object into the transport robot 300, and it should be understood that the transport robot 300 itself serves as the delivery place of the target object in such a case.

As another example, when the user's request is made by the user requesting the transport of the target object using a navigation system or another application (which may interwork with the navigation system) of his/her vehicle in a place (e.g., a parking lot of a mart) distinct from the delivery place of the target object, the information acquisition unit 210 according to one embodiment of the invention may acquire the user's account information or the like necessary for identification of the user as the information on the user. Further, the information acquisition unit 210 according to one embodiment of the invention may acquire a location of a delivery place where the user intends to place the target object (e.g., a delivery place closest to the user's residence, a delivery place designated by the user, a delivery place previously used by the user, or the like among a plurality of delivery places in an apartment complex where the user resides) as the information on the transport of the target object, on the basis of the information on the user. Furthermore, the information acquisition unit 210 according to one embodiment of the invention may acquire an estimated time of the user's arrival at the delivery place of the target object as the information on the transport of the target object, using the above navigation system or other application.

Meanwhile, according to one embodiment of the invention, the delivery place of the target object may be designated by the user within a predetermined spatial extent for the transport robot 300.

Specifically, according to one embodiment of the invention, the predetermined spatial extent for the transport robot 300 may refer to a spatial extent where the transport robot 300 may travel (e.g., an apartment complex where the transport robot 300 is used and the user resides), and a specific location within the spatial extent may be designated by the user as the delivery place of the target object.

Meanwhile, the information on the transport of the target object acquired by the information acquisition unit 210 according to one embodiment of the invention may further include information on at least one of a weight and a size of the target object.

To this end, the main body 310 of the transport robot 300 according to one embodiment of the invention may be coupled to supports 320*b*, 320*c*, and 320*d* configured to support at least one target object. According to one embodiment of the invention, the supports 320*b*, 320*c*, and 320*d* may be removably coupled for replacement or the like. Further, each of the supports 320*b*, 320*c*, and 320*d* may include a weight sensor (not shown) for sensing a weight supported by each of the supports 320*b*, 320*c*, and 320*d*, and the information acquisition unit 210 according to one embodiment of the invention may acquire the information on the weight of the target object using the weight sensor. According to one embodiment of the invention, the weight sensor may be implemented using one or more strain gauges (e.g., three strain gauges, four strain gauges, or the like). In addition, according to one embodiment of the invention, the weight sensor may be coupled to the processor 330. Meanwhile, according to one embodiment of the invention, the weight sensor may be included or installed in the delivery place.

Further, the main body 310 of the transport robot 300 according to one embodiment of the invention may include a photographing module (not shown) configured to face a spatial region above each of the supports 320*b*, 320*c*, and 320*d*, in place of or in addition to the weight sensor, and the information acquisition unit 210 according to one embodiment of the invention may acquire the information on the size of the target object using the photographing module. Meanwhile, according to one embodiment of the invention, the photographing module may be included or installed in the delivery place.

Although it has been described above that the information acquisition unit 210 according to one embodiment of the invention acquires the information on the user and the information on the transport of the target object, the manners of acquisition or the types of acquired information are not limited to the foregoing and may be diversely changed as long as the objects of the invention may be achieved.

Next, the determination unit 220 according to one embodiment of the invention may function to identify the user on the basis of the information on the user acquired by the information acquisition unit 210 according to one embodiment of the invention, and determine a place associated with the user as a destination where the transport robot 300 is to transport the target object from the delivery place, with reference to a result of the identification.

Specifically, when the RFID information, face image, voice, account information, or the like of the user is acquired as the information on the user, the determination unit 220 according to one embodiment of the invention may identify the user on the basis of the information on the user. To this end, the determination unit 220 according to one embodiment of the invention may employ an artificial neural network model based on a convolutional neural network (CNN), long short-term memory (LSTM), gated recurrent units (GRUs), or the like. Further, the determination unit 220 according to one embodiment of the invention may search a database or the like for a place matched with the user, i.e., a place associated with the user (e.g., the user's residence) by means of table lookup or the like, with reference to a result of the identification, thereby determining the matched place as the destination where the transport robot 300 is to transport the target object from the delivery place.

Meanwhile, the determination unit 220 according to one embodiment of the invention may determine a transport robot 300 capable of transporting the target object, from among a plurality of transport robots 300, on the basis of the information on at least one of the weight and size of the target object which may be included in the information on the transport of the target object.

For example, since a plurality of transport robots 300 used in a predetermined spatial extent (e.g., an apartment complex where the user resides) may have diverse shapes or structures, the determination unit 220 according to one embodiment of the invention may determine a transport robot 300 capable of transporting the target object, from among the plurality of transport robots 300, in consideration of at least one of the weight and size of the target object.

Further, the transport management unit 230 according to one embodiment of the invention may cause the determined transport robot 300 to travel to the delivery place of the target object, so that the target object may be transported by the determined transport robot 300. Other functions of the transport management unit 230 according to one embodiment of the invention will be described in detail below.

Next, the transport management unit 230 according to one embodiment of the invention may function to cause the target object to be transported to the destination by the transport robot 300.

Specifically, in order for the target object to be transported to the destination, the transport management unit 230 according to one embodiment of the invention may cause the transport robot 300 to travel to the delivery place of the target object, cause the transport robot 300 to wait at the delivery place of the target object, or cause the transport robot 300 loaded with the target object to travel from the delivery place to the destination.

Further, when the estimated time of the user's arrival at the delivery place of the target object is included in the information on the transport of the target object, the transport management unit 230 according to one embodiment of the invention may cause the transport robot 300 to travel such that the transport robot 300 arrives at the delivery place of the target object before the user, on the basis of the estimated arrival time. To this end, the transport management unit 230 according to one embodiment of the invention may perform scheduling of the transport robot 300 in consideration of a current transport situation, an expected transport situation, and the like of the transport robot 300. Furthermore, the transport management unit 230 according to one embodiment of the invention may perform the scheduling in consideration of information on time (e.g., average time, minimum time, maximum time, or estimated time) required for the transport robot 300 (or a plurality of transport robots 300 in a predetermined spatial extent where the transport robot 300 is used (e.g., an apartment complex where the user resides)) to transport the target object from a first delivery place to a destination and then travel to a second delivery place. Here, according to one embodiment of the invention, it should be understood that the first delivery place may be the same as the second delivery place.

For example, it may be assumed that average time required for the transport robot 300 used in the apartment complex where the user resides to transport the target object from the first delivery place to the destination and then travel to the second delivery place is 10 minutes, and an estimated time of the user's arrival at the second delivery place is 2:10 pm. In this case, the transport management unit 230 according to one embodiment of the invention may perform scheduling of the transport robot 300 such that the transport robot 300 does not assume a task of transporting another target object which starts at any one point in a time period from 2:00 pm to 2:10 pm.

Meanwhile, the transport management unit 230 according to one embodiment of the invention may cause a surrounding situation of the transport robot 300 to be recorded while the target object is transported to the destination by the transport robot 300.

Specifically, in order to prevent a situation in which, for example, the target object is lost while the target object is transported to the destination by the transport robot 300, the transport management unit 230 according to one embodiment of the invention may cause a surrounding situation of the transport robot 300 to be recorded by controlling an image acquisition module (e.g., a camera included in the transport robot 300 or CCTV installed in the vicinity of the transport robot 300), a sound acquisition module (e.g., a microphone included in the transport robot 300 or installed in the vicinity of the transport robot 300), and the like that may be included or installed in the transport robot 300 and/or the vicinity of the transport robot 300.

In addition, the transport management unit 230 according to one embodiment of the invention may control a transport means present in a travel route of the transport robot 300, which the transport robot 300 may take.

Specifically, the transport management unit 230 according to one embodiment of the invention may control a transport means (e.g., an elevator that the transport robot 300 may take) present in a route along which the transport robot 300 travels to transport the target object to the destination, according to a transport situation of the transport robot 300.

For example, the transport management unit 230 according to one embodiment of the invention may control a transport means present in a travel route of the transport robot 300 such that waiting time for the transport robot 300 to take the transport means is minimized, thereby minimizing time required for the transport robot 300 to transport the target object.

Meanwhile, the transport management unit 230 according to one embodiment of the invention may control a module for loading and unloading (e.g., a conveyor, a grab, or a robotic arm module) which may be included or installed in the transport robot 300, the delivery place of the target object, and/or the destination of the target object, so that the target object may be loaded into or unloaded from the transport robot 300.

Next, the communication unit 240 according to one embodiment of the invention may function to enable data transmission/reception from/to the information acquisition unit 210, the determination unit 220, and the transport management unit 230.

Lastly, the control unit 250 according to one embodiment of the invention may function to control data flow among the information acquisition unit 210, the determination unit 220, the transport management unit 230, and the communication unit 240. That is, the control unit 250 according to one embodiment of the invention may control data flow into/out of the robot control system 200 or data flow among the respective components of the robot control system 200, such that the information acquisition unit 210, the determination unit 220, the transport management unit 230, and the communication unit 240 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a transport robot, the method comprising the steps of:
    acquiring, when a user makes a request for transport of a target object, information on the transport of the target object including a delivery place where the target object is to be delivered to a transport robot and an estimated time of the user's arrival at the delivery place;
    determining the transport robot as an autonomous transport robot capable of transporting the target object among a plurality of autonomous transport robots, on the basis of the information on the transport of the target object;
    controlling the transport robot to autonomously travel to the delivery place such that the transport robot arrives at the delivery place before the user, on the basis of the estimated time of the user's arrival;
    acquiring, by an image acquisition module of the transport robot, information on the user after the user arrives at the delivery place;
    identifying the user on the basis of the information on the user;
    searching a database to obtain a place associated with the user based on the identification of the user;
    determining the place associated with the user as a destination where the transport robot is to transport the target object from the delivery place; and
    controlling the transport robot to autonomously travel from the delivery place to the destination to transport the target object based on analysis of images of surroundings acquired by the image acquisition module.

2. The method of claim 1, wherein the information on the transport of the target object further includes information on at least one of a weight and a size of the target object.

3. The method of claim 2, wherein the information on the weight of the target object is acquired using a weight sensor included in the transport robot, and the information on the size of the target object is acquired using a photographing module included in the transport robot.

4. The method of claim 1, wherein the delivery place is capable of being designated by the user within a predetermined spatial extent for the transport robot.

5. The method of claim 1, wherein in the step of causing the transport robot to autonomously travel to the delivery place and transport the target object to the destination, a surrounding situation of the transport robot is recorded while the target object is transported to the destination by the transport robot.

6. The method of claim 1, wherein in the step of causing the transport robot to autonomously travel to the delivery place and transport the target object to the destination, a transport means present in a travel route of the transport robot, which the transport robot is capable of taking, is controlled.

7. A non-transitory computer-readable recording medium having stored thereon a computer program for executing the method of claim 1.

8. A system comprising:
    a transport robot configured to acquire, by an image acquisition module of the transport robot, information on a user at a delivery place where a target object is to be delivered to the transport robot; and
    a robot control system comprising:
    an information acquisition unit configured to acquire, when the user makes a request for transport of the target object, information on the transport of the target object including the delivery place and an estimated time of the user's arrival at the delivery place;
    a determination unit configured to determine the transport robot as an autonomous transport robot capable of transporting the target object among a plurality of autonomous transport robots, on the basis of the information on the transport of the target object, acquire the information on the user from the image acquisition module of the transport robot after the user arrives at the delivery place, identify the user on the basis of the information on the user, search a database to obtain a place associated with the user based on the identification of the user, and determine the place associated with the user as a destination where the transport robot is to transport the target object from the delivery place; and
    a transport management unit configured to control the transport robot to autonomously travel to the delivery place such that the transport robot arrives at the delivery place before the user, on the basis of the estimated time of the user's arrival, and to autonomously travel from the delivery place to the destination to transport the target object based on analysis of images of surroundings acquired by the image acquisition module.

9. The system of claim 8, wherein the information on the transport of the target object further includes information on at least one of a weight and a size of the target object.

10. The system of claim 9, wherein the information on the weight of the target object is acquired using a weight sensor included in the transport robot, and the information on the size of the target object is acquired using a photographing module included in the transport robot.

11. The system of claim 8, wherein the delivery place is capable of being designated by the user within a predetermined spatial extent for the transport robot.

12. The system of claim 8, wherein the transport management unit is configured to cause a surrounding situation of the transport robot to be recorded while the target object is transported to the destination by the transport robot.

13. The system of claim 8, wherein the transport management unit is configured to control a transport means present in a travel route of the transport robot, which the transport robot is capable of taking.

* * * * *